UNITED STATES PATENT OFFICE.

MAXIMILIAN PAUL SCHMIDT, OF BIEBRICH-ON-THE-RHINE, GERMANY, ASSIGNOR TO THE FIRM OF KALLE AND COMPANY, AKTIENGESELLSCHAFT, OF BIEBRICH-ON-THE-RHINE, GERMANY.

MANUFACTURE OF VAT DYESTUFFS OF THE CARBAZOLE NAPHTHOQUINONE SERIES.

1,261,858.  Specification of Letters Patent.  Patented Apr. 9, 1918.

No Drawing.  Application filed April 28, 1916.  Serial No. 94,238.

*To all whom it may concern:*

Be it known that I, MAXIMILIAN PAUL SCHMIDT, chemist, and a subject of the King of Saxony, residing at Biebrich-on-the-Rhine, 18$^r$ Rathausstrasse, Germany, have invented certain new and useful Improvements in Manufacture of Vat Dyestuffs of the Carbazole Naphthoquinone Series, of which the following is a specification.

I have found that the carbazole-naphthoquinones derived from alpha- or beta- naphthylamin still present a similar capacity of condensation as the simple quinones themselves. They give valuable vat dye-stuffs of a brown to black tint with the usual compounds containing reactive hydrogen-atoms. Amins, sulfinic-acids, oxythionaphthene, indoxyl or their derivatives and in general all compounds containing reactive hydrogen atoms are suitable for the condensation. It seems that the condensation takes place in the same manner as with naphthoquinones, the element connected with the reactive hydrogen- atoms going in orthoposition to one of the quinone-oxygen-atoms, whereby leuco-compounds are produced in the first place with change or may be converted into vat dye-stuffs, either by the action of the oxygen of the air or by the employment of other means of oxidation.

The initial products, the carbazole-naphthoquinones may be manufactured from oxynaphthocarbazoles according to the methods usual for the production of quinones. They probably have the following formulæ:

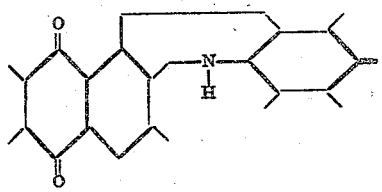 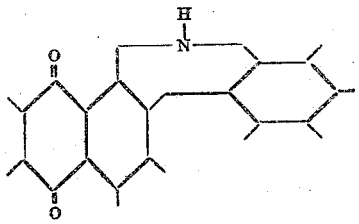

They are reddish-brown powders, difficultly soluble in the usual solvents. They may be crystallized from hot glacial acetic acid. With alkaline hydrosulfite they give a yellow vat, from which wool is dyed brown.

The invention may be illustrated by the following examples. The parts are by weight.

Example I.

24.7 parts of the quinone obtainable from the 1.2 - pheno - 5 - oxynaphthocarbazole are suspended in about 250 parts of water, and 15.6 parts of toluene sulfinic acid are added. The mass is acidified with some hydrochloric acid and heated and stirred on the water-bath for some hours. It is then made alkaline and air is blown through it, until the dye-stuff is fully oxidized. The precipitate of a brown color is drained off and washed with water.

The dye-stuff yields with alkaline reducing agents a yellow vat, from which wool is dyed with fast brown tints.

Example II.

5 parts of the naphthoquinone-carbazole according to Example I are dissolved in 150 parts of glacial acetic acid and 4 parts of anilin are added. The mass is boiled for about 20 minutes. It is then diluted with a sufficient quantity of water and filtered. The obtained precipitate is suspended in hot diluted soda-lye and the formed leuco-compound oxidized to the dye-stuff by blowing air into the mass. It is then acidified, drained off and washed with some alcohol.

The dye-stuff is a brown powder and dyes wool and cotton fast brown tints from the yellowish-brown vat.

Example III.

35 parts of the naphthoquinone-carbazole mentioned in Example I are dissolved in 1000 parts of hot glacial-acetic acid, whereupon 10.6 parts of oxythionaphthene and 10 parts of concentrated hydrochloric acid are added. The mass is now boiled for a short time and drained off after having been cooled. The residue is washed with some glacial acetic acid and then with alcohol.

The formed dye-stuff is a black powder soluble in concentrated sulfuric acid with a greenish-blue color. With alkaline hydrosulfite it yields a yellow vat, from which wool is dyed violet-black. By acidifying while boiling the tint becomes a little redder.

*Example IV.*

52.2 parts of the naphthoquinonetolucarbazole of the following formula:

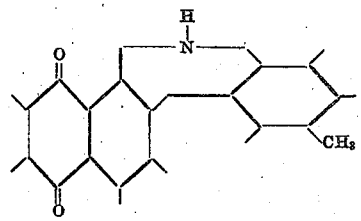

are mixed with 800 parts of water and a solution or suspension of 38.8 parts of oxythionaphthene-carboxylic-acid is added.

The mass is boiled for some time, drained off and washed with water. The residue is suspended in about 700 parts of hot water and, after being made alkaline with a little of soda lye, treated with air, until the leucocompound of the coloring matter is wholly disappeared. The napthoquinonetolucarbazole employed in this example and represented by the above structural formula may be produced by oxidizing tolu-5-oxy-naphtholcarbazole with bichromate of sodium and diluted sulfuric acid. It is a brown body, rather difficultly soluble in the usual organic solvents and crystallizing from alcohol in big prismatic crystals of the melting point 255° C. It dyes wool in alkaline hydrosulfite reddish-brown and dissolves in conc. sulfuric acid with a green coloration. The dye-stuff thus obtained is similar to that described in Example III.

*Example V.*

63 parts of an indoxyl-melt containing 27 per cent. of indoxyl are brought into 300 parts (by volume) of glacial acetic acid while cooling. 26.2 parts of the naphthoquinonetolucarbazole described in Example IV are then added and the mass is heated to boiling and stirred. After having boiled for about one and a half hours, the deposited black dye-stuff is filtered and washed with alcohol and hot water.

It is soluble in conc. sulfuric acid with an olive-green coloration. With alkaline hydrosulfite it yields a yellow vat from which wool is dyed black tints.

In the foregoing examples the derivatives of the naphthoquinone-carbazoles may also be employed.

I claim:

1. Process of producing vat dye-stuffs, consisting in condensing a carbazole-naphthoquinone with a compound containing reactive hydrogen atoms and being capable to condense with a benzo- or naphthoquinone.

2. As new products the vat-dyestuffs obtainable by condensing a carbazolenaphthoquinone with a compound containing reactive hydrogen atoms, being capable to condense with benzo- or naphthoquinones, being brown to black powders, insoluble in water, difficultly soluble in the usual organic solvents, forming with alkaline reducing agents a yellow to brown vat, from which the fiber is dyed brown to black tints.

3. As a new product, the vat-dye stuff obtainable by condensing a carbazole-naphthoquinone compound with an aromatic compound containing a reactive hydrogen atom, being a dark colored powder insoluble in water, difficultly soluble in the usual organic solvents, forming with alkaline reducing agents, a yellow to brown vat, from which the fiber is dyed brown to black tints.

4. As a new product, the vat-dye stuff obtainable by condensing a carbazole-naphthoquinone with oxythionaphthene, being a black powder dissolving in concentrated sulfuric acid, greenish-blue, forming a yellow vat with alkaline reducing agents, from which wool is dyed in violet-black tints becoming redder by acidifying in the heat.

5. As a new product the vat dyestuff, obtainable by condensing naphthoquinonetolucarbazole with oxythionaphthene, being a black powder dissolving in concentrated sulfuric acid greenish-blue, forming a yellow vat with alkaline reducing agents, from which wool is dyed in violet-black tints becoming redder by acidifying in the heat.

In testimony whereof I have signed my name to this specification in the presence of two subscribing witnesses.

MAXIMILIAN PAUL SCHMIDT.

Witnesses:
August Roth,
Moritz Wetsel.

Copies of this patent may be obtained for five cents each, by addressing the "Commissioner of Patents, Washington, D. C."